(12) United States Patent
He

(10) Patent No.: US 7,593,905 B2
(45) Date of Patent: Sep. 22, 2009

(54) METHOD OF COMBINATORIAL MULTIMODAL OPTIMISATION

(75) Inventor: Liwen He, Ipswich (GB)

(73) Assignee: British Telecommunications plc, London (GB)

(*) Notice: Subject to any disclaimer, the term of this patent is extended or adjusted under 35 U.S.C. 154(b) by 0 days.

(21) Appl. No.: 10/507,112

(22) PCT Filed: Mar. 12, 2003

(86) PCT No.: PCT/GB03/00998

§ 371 (c)(1),
(2), (4) Date: Sep. 10, 2004

(87) PCT Pub. No.: WO03/079288

PCT Pub. Date: Sep. 25, 2003

(65) Prior Publication Data

US 2005/0097559 A1    May 5, 2005

(30) Foreign Application Priority Data

Mar. 12, 2002   (EP)  .................................. 02251713

(51) Int. Cl.
*G06N 3/12*  (2006.01)

(52) U.S. Cl. .............................. 706/13; 706/16; 706/19; 700/28; 700/29; 700/30; 700/31; 700/33; 700/47; 700/49; 700/100

(58) Field of Classification Search .................. 706/19, 706/10, 12–16; 700/28–33, 48–52, 99–104
See application file for complete search history.

(56) References Cited

U.S. PATENT DOCUMENTS 5,136,686 A * 8/1992 Koza ........................... 706/13
5,343,554 A * 8/1994 Koza et al. ...................... 706/13
6,088,690 A * 7/2000 Gounares et al. ............... 706/13
6,215,771 B1 * 4/2001 Turner et al. .................. 370/235
6,233,493 B1 * 5/2001 Cherneff et al. ............... 700/95
6,374,202 B1 * 4/2002 Robinson ..................... 703/13
6,597,996 B1 * 7/2003 Venkataraman et al. ....... 702/27
6,662,167 B1 * 12/2003 Xiao ........................... 706/13
6,957,200 B2 * 10/2005 Buczak et al. ................. 706/13

(Continued)

FOREIGN PATENT DOCUMENTS

WO     WO 02 03716 A     1/2002

(Continued)

OTHER PUBLICATIONS

Tahk et al, "Coevolutionary Augmented Lagrangian Methods for Constrained Optimization"., IEEE Transactions on Evolutionary Computation, Jul. 2000.*

(Continued)

*Primary Examiner*—David R Vincent
*Assistant Examiner*—Omar F Fernandez Rivas
(74) *Attorney, Agent, or Firm*—Nixon & Vanderhye PC (57) ABSTRACT

A method of combinatorial multimodal optimization uses a genetic algorithm to find simultaneous global optimal solutions to combinatorial problems. Each individual within the population is associated not only with a fitness value but with a fitness vector, using which the persistence of all of the best individuals into the next generation can be guaranteed. Phenotype as well as genotype analysis is an integral part of the method.

23 Claims, 3 Drawing Sheets

U.S. PATENT DOCUMENTS

2003/0055614 A1* 3/2003 Pelikan et al. .................. 703/2
2004/0059696 A1* 3/2004 Kropaczek et al. ............. 706/46
2004/0204869 A1* 10/2004 Venkataraman et al. ....... 702/30

FOREIGN PATENT DOCUMENTS

WO      WO 02/03716 A1 * 1/2002

OTHER PUBLICATIONS

European Search Report.
International Search Report.
Merz et al, "A Comparison of Memetic Algorithms, Tabu Search, and Ant Colonies for the Quadratic Assignment Problem" Proceedings of the 1999 Congress on Evolutionary Computation 9CEC '99), Washington, DC. USA, Jul. 6-9, 1999, vol. 1, pp. 2063-2070, XP002154390.
Knowles et al, "The Pareto Archived Evolution Strategy: A New Baseline Algorithm for Pareto Multiobjective Optimisation", Proceedings of the 1999 Congress on Evolutionary Computation (CEC '99), Washington, D.C., USA, Jul. 6-9, 1999, vol. 1, pp. 98-105, XP002154391.
Ishibuchi et al, "Local Search Procedures in a Multi-Objective Genetic Local Search Algorithm for Scheduling Problems", 1999 IEEE Conference on Systems, Man and Cybernetics (IEEE SMC '99), Tokyo, Japan, Oct. 12-15, 1999, vol. 1, pp. 665-670, XP002154392.
Knowles et al, "M-Pages: A Memetic Algortihm for Multiobjective Optimisation", Proceedings of the 2000 Congress on Evolutionary Computation (CEC '00), La Jolla, CA, USA, Jul. 16-19, 2000, vol. 1, pp. 325-332, XP002154422.
International Preliminary Examination Report, PCT/GB00/03482, dated Mar. 3, 2003, 5 pgs.
PCT/GB 03/00998 International Search Report dated Jun. 5, 2003.
EP 02251713.0 European Search Report dated Oct. 23, 2002.
Tahk et al., "Coevolutionary Augmented Lagrangian Methods for Constrained Optimization," IEEE Transactions on Evolutionary Computation, vol. 4, No. 2, Jul. 2000.
U.S. Appl. No. 10/312,719, filed Dec. 2002, Corne et al.

* cited by examiner

METHOD OF COMBINATORIAL MULTIMODAL OPTIMISATION

This application is the US national phase of international application PCT/GB03/00998 filed 12 Mar. 2003 which designated the U.S. and claims benefit of EP 02251713.0, dated 12 Mar. 2002, the entire content of which is hereby incorporated by reference.

BACKGROUND

1. Technical Field

The present invention relates to methods of combinatorial multimodal optimisation, and in particular to the use of genetic algorithms for solving combinatorial multimodal optimisation problems. The invention is expected to find particular although not exclusive application in the fields of load balancing (e.g processor and network load balancing), scheduling optimization (including production scheduling, resource assignments, timetable scheduling) and resource planning.

2. Related Art

An optimisation problem is always a simplication of a real world problem, an engineer needs to suggest various possible optimal solution alternatives to the decision maker in order to understand this problem better.

BRIEF SUMMARY

Many problems in the scheduling of manufacturing systems and artificial intelligence can be regarded as combinatorial multimodal optimisation problems, which require the determination of multiple integer solution vectors that maximise (or minimise) a given objective function with regard to some definite set of constraints. Problems of this class, which are characterised by their discreteness, high dimension and noise, are quite different from multimodal continuous function optimisation problems. The combinatorial multimodal optimisation problem is arguably one of the most deceptive problems for GA applications.

So-called genetic algorithms (GA) are well-known stochastic optimisation search methods which are based on a global search procedure. But the use simple genetic operators (selection, multi-point crossover and mutation) to solve a typical combinatorial multimodal optimisation problem, provides only a single (global or local) optimal solution for each search procedure [He Liwen and Mort. Neil: Genetic Algorithm for Scheduling Optimization on a Multi-Product Batch Processing Machine. 4$^{th}$ IFAC Workshop on Intelligent Manufacturing Systems, Seoul, Korea, PP 165-170, 1997]. The reason is that, as there is no selective pressure among any of the peaks for the finite population in the fitness landscape, the population converges to one alternative or another randomly. This problem is known as genetic drift—stochastic errors in sampling caused by small population size. In other words, this difficulty comes from the fundamental theorem of genetic algorithms which tells us that exponentially increasing trials will be given to the best schemata observed, thus losing some potentially useful schemata during the evolution.

Therefore, the problem is how to reduce the effect of this genetic drift and keep the population diversity in GA search in order to find different fitness peaks, and lead populations to move from local optima to global optima.

A typical NP-hard Combinatorial Optimisation Problem could be described as follows [Jelasity, M. and Dombi, J: GAS, a Concept on Modelling Species in Genetic Algorithms. *Artificial Intelligence*, Vol. 99, No. 1, pp. 1-19, 1998]:

A set $W=\{w_1, w_2, \ldots, w_n\}$ of n integers and a large integer P is given. We would like to find an $S \subseteq W$ such that the sum of the elements in S is close to, without exceeding, P, perhaps subject to some problem-specific constraint conditions. The number of elements in S is given as in.

To take a simple similar example of an NP-hard Combinational Optimization Problem, let us assume that we have eleven jobs of various sizes that need to be shared, within a computer system, between five parallel processors. Each processor is capable of handling a single job of size 9, or any combination of smaller jobs having a total aggregate size of no more than 9.

In this example, let us assume that the eleven jobs are defined by the set $W=\{2, 7, 5, 4, 3, 6, 2, 4, 2, 8, 1\}$ of 11 integers; using the above terminology, n=11, and P=9; furthermore, we introduce a variable m which specifies the number of subsets to form; in the present case m=5. The task, then, is to define 5 groups of jobs such that the sum of the values within each group is close to, but does not exceed, 9.

One possible solution is as follows:

Processor 1: {2, 7}

Processor 2: {5, 4}

Processor 3: {3, 6}

Processor 4: {2, 4, 2} and

Processor 5: {8, 1}

With this solution, four of the processors have an aggregate workload of 9, while the remaining processor (processor 4) has an aggregate work value of 8. Since all of these workloads are sufficiently close to but do not exceed the maximum value of 9, we say that the fitness value of this possible solution is 5. Since that is the same as the number of processors, this solution is optimal.

Other trial solutions may give less good results. In the following groupings,

Processor 1: {2, 7}

Processor 2: {5, 4}

Processor 3: {3, 6, 2}

Processor 4: {4, 2}; and

Processor 5: {8, 1} only the first, second and fifth processors have a full workload. The third processor has a workload of 11 and is so overextended, while the fourth processor has a workload of 6 and is under-utilised. Since only three of the five groupings meet the problem criteria, the fitness value of this possible solution is 3.

If the number of the global optima is greater than 1 in the solution space, then this problem is regarded as a combinatorial multimodal optimization problem.

Conventional genetic algorithms start with an initial population of individuals (trial solutions). The fitness value of each individual is evaluated according to some function (sometimes called the "objective function"), and there then follows a solution process under which individuals with higher fitness values have a higher probability of surviving into the next generation. Typically, individuals with low selection values are eliminated entirely, and individuals with high selection values are replicated several times, in proportion to their fitness value. Genetic operators such as crossover and mutation are then applied to the population, and the fitness values of the new individuals are re-evaluated. This process continues until the algorithm converges.

As mentioned previously, such an approach is limited because of the problems of genetic drift, and the fact that only a single optimal solution can be obtained. Indeed, the very nature of the procedure tends to ensure that sub-optimal individuals (in terms of fitness value) ultimately become reduced and eliminated from the population, so ensuring that as the algorithm proceeds only a smaller and smaller area of the solution space is explored. That may be useful for finding local optima, but at the expense of finding global optima.

Several approaches have been proposed to deal with these problems, such as niching methods, fitness sharing, [Sareni, B and Krahenbuhl, L: Fitness Sharing and Niching Methods Revisited. *IEEE Transactions on Evolutionary Computation*. Vol. 2, No. 3, 1998] and parallel genetic algorithms Chipperfield A. J and Fleming, P. J: Parallel Genetic Algorithms: A Survey. Research Report No. 518, Department of Automatic Control and Systems Engineering, University of Sheffield, 1994]. Other techniques include those proposed by Sirinivas, M. and Patnaik. L. M: Adaptive Probabilities of Crossover and Mutation in Genetic Algorithms. *IEEE Transaction on Systems, Man and Cybernetics*. Vol. 24, No. 4, 1994; Schneider. G., Schuchhardt. J. and Wrede. P: Evolutionary Optimization in Multimodal Search Space. *Biological Cybernetics*. Vol. 74, No. 3, pp. 203-207, 1996; Yao. X and Liu. Y: Fast evolution strategies. *Control and Cybernetics*. Vol. 26, No. 3, pp. 467-496, 1997; and Jelasity, M. and Dombi, J: GAS, a Concept on Modelling Species in Genetic Algorithms. *Artificial Intelligence*, Vol. 99, No. 1, pp. 1-19, 1998.

Both niche techniques and adaptive GA require a previous understanding of the number and the distribution of fitness peaks, and need careful setting of various parameters. Parallel GA has proven very reliable and efficient in exploring multimodal fitness peaks, and it also needs fewer assumptions than niche methods. The main limitation of implementing Parallel GA is the sub-population size which limits the total number of global optima found in the search.

According to the present invention there is provided a method of combinatorial multimodal optimisation for finding multiple optimal ways of dividing a set W of n values into m groups, such that each of the groups satisfies a respective constraint condition, the method comprising:
(a) defining an initial population of individuals, each representative of a trial solution;
(b) calculating for each individual a fitness vector indicative of whether the constraint condition for each group has been satisfied;
(c) selecting a plurality of individuals for the next generation in dependence upon their respective fitness vectors;
(d) creating a new population including the selected individuals; and
(e) repeating steps (b) to (d) until the population stabilizes, the individuals of the stable population representing multiple optional ways of dividing the set W.

BRIEF DESCRIPTION OF THE DRAWINGS

The accompanying

DETAILED DESCRIPTION OF EXEMPLARY EMBODIMENTS

Experimental results show that both convergence speed and quality are greatly improved in comparison with other GA techniques. They also suggest that this novel method has the capability of generating sufficient genetic innovations, preserving promising genetic diversity, guiding population escape from local optima and exploring multiple global optima effectively and efficiently in this difficult combinatorial multimodal optimization problem.

The novel method works through deeply preserving the population diversity based on a phenotypic analysis, rather than simply a genotypic analysis. This reinforces the power of the method to process many building blocks in the search space simultaneously. This power is stronger than that of the implicit parallelism found in simple genetic algorithms, and thus enhances the exploration of GA space for multiple optima.

In this novel method a hybrid drift model, through the complementary interaction between genetic drift and neutral drift, can help a population escape away from local optima. When the relative fitness vector of one individual is non-dominated by that of any other one in the entire population, 'neutral drift' is in effect. Any non-dominated individuals are regarded as having equal-(relative)-fitness values and kept for the next generation, thus facilitating the exploration of the different adaptive peaks. On the other hand, when one individual is dominated by another, 'genetic drift' effectively lets this less fit individual die out. This model has been shown to be effective in leading populations to escape from local optima to global optima in this typical combinatorial multimodal optimisation problem.

The invention may be carried into practice in a number of ways and one specific example will now be described, merely by way of example.

Figure 1:
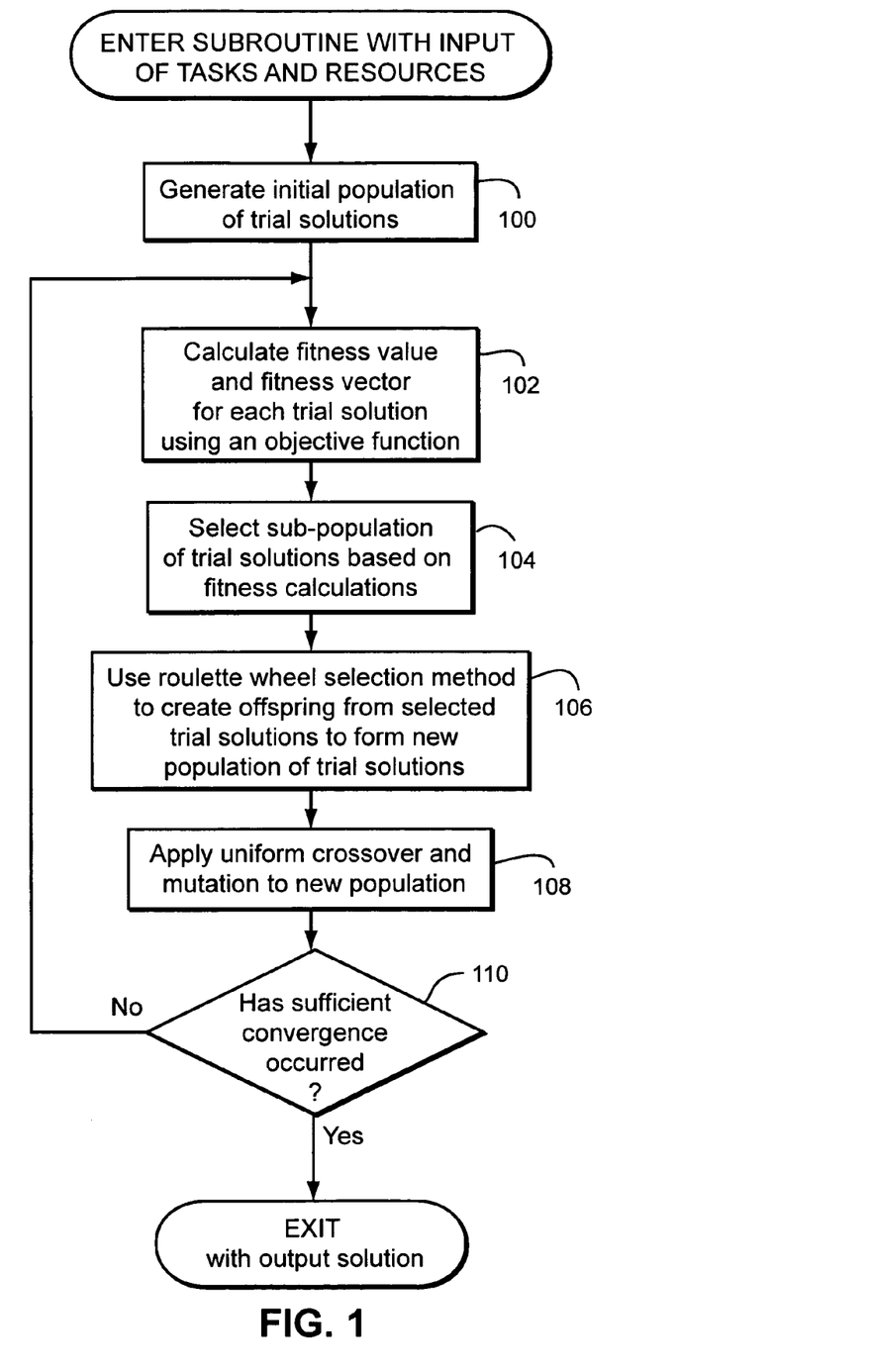
FIG. 1 illustrates a flow chart of process steps in accordance with an exemplary embodiment of this invention and FIGS. 2-3 illustrate exemplary implementations of this exemplary embodiment.

Briefly stated, the preferred method of the present invention makes use of a genetic algorithm having the following steps as depicted in FIG. 1:
1. At 100, initial population of individuals is randomly generated, each individual being represented by a string of integers which defines a trial solution;
2. At 102, a fitness value and fitness vector is calculated for each individual, according to an objective function;
3. At 106, on the basis of the fitness values and the fitness vectors, suitable individuals are selected to form a sub-population whose size is a portion of the overall population;
4. At 108, a roulette wheel selection method is then used to create offspring, from the selected individuals, to form a new population;
5. At 110, highly uniform crossover and mutation is applied to the individuals of the new population; and
6. At 112, steps 2 to 5 (boxes 102-110 in FIG. 1) are repeated until the algorithm converges.

It will be understood that the flow chart boxes in FIG. 1 also represent a physical embodiment of this exemplary embodiment (e.g., as embodied in suitable computer hardware and software for carrying out the process steps depicted). Each of these individual steps will be described in more detail below.

First, we will consider representation and initialisation of the population. A major difficulty in applying GA in a scheduling problem is finding an appropriate representation for the population. Here, an integer string representation of the individual is selected according to the following conditions:
 a. Completeness: the string representation should contain all possible individuals in the search population.
 b. Uniqueness: the string maps to the individual on a one to one basis.

A second desideratum is to generate the initial population randomly. For example, a population is composed of $N_{chrom}$ individuals each of which is an integer string with n genes.

The initial population is produced by creating a ($N_{chrom} \times n$) matrix with the component randomly selected from the set {1, ..., m}.

In contrast with the prior art, the fitness of each individual is determined not only on the basis of the fitness value but on that individual's fitness vector.

The fitness vector is a binary vector of length m, the individual bits of which indicate, for that individual, whether the groupings satisfy or do not satisfy the problem constraints for each of the m groupings.

To go back to the example previously discussed, in which 11 parcels of work have to be divided between five processors, such that no processor takes more than 9 work units, the first solution given satisfied the constraints for all of the five processors. Its fitness value was therefore 5, and its fitness vector FV=[1 1 1 1 1]. The second, less-good solution, satisfied the constraints only for the first, second and fifth processors, and hence had a fitness value of 3. The fitness vector in that case becomes [1 1 0 0 1].

It will be understood of course that, with this approach, the fitness value is simply equivalent to the number of positive bits within the fitness vector.

We now introduce some additional terminology, to be used in the remainder of the description. GA applications sometimes refer to the individuals within the evolving population as genotypes. Following that analogy, we shall refer to analysis using the fitness vector as phenotype or phenotypic analysis. We define the groups of combinations making up the solutions, for each individual, as a phenotype schema.

To clarify this further, it may be useful to consider a further example which comes from a practical shoe batch processing machine (BPM) optimization problem. This problem is described in Fanti, M. P, Maione, B, Piscitelli, G and Turchiano, B: Heuristic scheduling of jobs on a multi-product batch processing machine, *International Journal of Production Research*, 34, pp. 2163-2186, 1997. In this problem, n is 21, m is 7, P is 811, and the vector W is defined by:

[12 12 170 176 216 231 266 310 380 497 714 144 128 153 660 688 50 6 454 282 114]

Thus, the problem comprises dividing up the elements of W into seven groups, such that the sum of the elements in each group is close to but does not exceed 811. We will now consider how, in the preferred embodiment, any fitness value and fitness vector is calculated for an individual or trial solution which is defined by an integer string b, of length 21, as follows:

[4 5 3 7 7 4 4 1 5 1 2 6 7 5 6 2 3 6 3 7 4]

First, the twenty one integers are mapped to a trial phenotypic solution $M_1$ matrix. $M_1$ has seven columns, one for each of the seven possible groups, as follows:

| Group | 1 | 2 | 3 | 4 | 5 | 6 | 7 |
|---|---|---|---|---|---|---|---|
| $M_1$ | 310 | 714 | 170 | 12 | 12 | 144 | 176 |
|  | 497 | 688 | 50 | 231 | 380 | 660 | 216 |
|  | 0 | 0 | 454 | 266 | 153 | 6 | 128 |
|  | 0 | 0 | 0 | 114 | 0 | 0 | 282 |
| Sum | 807 | 1402 | 674 | 623 | 545 | 810 | 802 |
| Phenotype schema | $s_1$ |  |  |  |  | $s_2$ | $s_3$ |

As may be evident, $M_1$ is filled with the values taken from W, those values going into the columns defined by the integers of the string b. Thus, the first value (12) within W goes into column 4, the second value (12) goes into column 5, the third value (170) goes into column 3, and so on. If a column already has a number in it, the next number is simply placed below.

As shown above, the columns are then summed, and each sum is tested against the problem constraint conditions to see whether it complies or not. The problem constraint conditions will of course vary from problem to problem, but in this particular example the conditions are that the phenotype $M_1$ for the string b should satisfy the two following conditions:

$$\text{sum}(s_j) \leq p = 811$$

$$\text{and} \sum_{j=1}^{N_c} (p - \text{sum}(s_j)) \leq p \times m - \text{sum}(W) = 811 \times 7 - 5663 = 14$$

$$\text{for } j = 1, 2, 3$$

where $N_c$ is the number of phenotype schemata (here 3) included in the phenotype $M_1$, and $s_j$ is the j-th phenotypic schemata.

In the table above, $s_1$, $s_2$ and $s_3$ are the phenotype schemata which satisfy the constraint conditions. Since there are three of those, the fitness value of the string b is 3. The positions of the schemata mean that the fitness vector for b is [1 0 0 0 0 1 1].

More formally:

Assume that there are a total q of different phenotypic schema $s_1, s_2, \ldots, s_q$ searched in a population, the phenotype schemata vector $M=[s_1, s_2, \ldots, s_q]$ is built up as a database of all searched phenotypic schemata in the entire population.

The phenotype of individual j can be mapped into its relative fitness binary vector fv(j) as a binary string in relation to the schemata vector M according to the following principle:

$$fv(j) = [b_1 \, b_2 \ldots b_q]; \text{ and } b_i(i=1,\ldots,q) \text{ is a binary bit,}$$

$$b_i = \begin{cases} 1 & \text{if the phenotype of individual } j \text{ includes the schema } s_i; \\ 0 & \text{if the phenotype of individual } j \text{ does not include the schema } s_i \end{cases}$$

To take a final example, the table below shows the phenotypic schema, fitness value and corresponding fitness vector for four individuals $j_1, j_2, j_3, j_4$, and 5 searched phenotypic schemata, namely a, b, c, d, e:

| Individual | Phenotypic schema | Fitness value | Fitness vector |
|---|---|---|---|
| $j_1$ | {a, d} | 2 | (1, 0, 0, 1, 0) |
| $j_2$ | {b, c, d, e} | 4 | (0, 1, 1, 1, 1) |
| $j_3$ | {a, c, d, e} | 4 | (1, 0, 1, 1, 1) |
| $j_4$ | {a, b, c, d, e} | 5 | (1, 1, 1, 1, 1) |

Once the fitness value and fitness vector have been calculated for each of the individuals within the population, a selection process takes place to choose which of those individuals are to be retained and which discarded. The selection process is carried out in two stages:

1. First, a reserved sub-population of the best individuals is kept. Individuals are chosen for this sub-population on the basis of their fitness vectors (and possibly their fitness values as well). One copy only of each individual is retained, thereby ensuring that none of the best individuals within the previous generation can be lost. Typically, the size of this sub-population is limited to around 20% of the total population size.

2. Next, the remaining 80% of the spaces are filled, using a so-called roulette wheel section method on all of the existing individuals. Using this method, offspring for the next generation are created on the basis of the fitness values of the individuals in the current generation. The higher the fitness value of an individual, the more offspring (copies) of that individual will be retained in the next generation. Preferably, the number of offspring is substantially proportional to the fitness value.

In order to understand how the reserved 20% sub-population is filled, it is necessary to introduce the concept of Pareto Optimality: [Goldberg, D. E: *Genetic Algorithms in Search, Optimization, and Machine Learning*, Reading, Mass.: Addison Wesley, 1989]. Using this concept, it may be stated that a vector x is partially less than y, symbolically x<p y, when the following conditions hold:

$$x <_p y \Leftrightarrow (\forall_i)(x_i \leq y_i) \wedge (\exists i)(x_i < y_i)$$

Under these circumstances we say that vector x is dominated by vector y. If a vector is not dominated by any other, we define it as nondominated.

Turning back to the previous table, giving fitness vectors for the individuals $j_1, j_2, j_3, j_4$, we can say that individual $j_1$ is dominated by both individual $j_3$ and $j_4$, but individual $j_2$ and $j_3$ are not dominated with each other. Individual $j_4$ is not dominated by any other individuals in the population: it is a non-dominated individual in this population.

Different non-dominated individuals should be kept in the next generation after selection. Actually, most of these non-dominated individuals contain few schemata; they are inferior individuals with relatively smaller absolute fitness values, and might not continue to evolve. So these non-dominated individuals are ranked according to their absolute fitness value: non-dominated individuals with greatest absolute fitness value Ma so far are ranked as 'first class' individuals, and others with absolute fitness value (Ma−k) (for positive integer k=1, 2, . . . ; and k≦Ma) are ranked as (k+1) class individuals. The value of k is determined by the initial population size and the number of non-dominated individuals; the greater the value of k, the more genetic diversity will be preserved, and the more computation complexity will be required. In this case study, k is chosen as 1, which means that only first and second class non-dominated individuals searched so far are guaranteed to be preserved in the next generation in order to maintain suitable genetic diversity and accelerate convergence speed.

The number of non-dominated individuals is preferably fixed to a portion of population size, otherwise no space is available for new entries in the population. The size of non-dominated individuals is preferably set as 20% of population size.

Once the reserved sub-population has been determined, the remaining 80% is filled, as mentioned above, using roulette wheel selection: Goldberg, D. E.: *Genetic Algorithms in Search, Optimization, and Machine Learning*, Reading, Mass.: Addison Wesley, 1989. In this selection, bias optimum is used as the reproduction operator. The number of expected individuals is given by:

$$\text{integer}\left(\frac{FitnessValueofIndividual}{\sum FitnessValueofIndividuals} \times \text{Population size}\right)$$

Once the new population has been chosen, crossover and mutation is applied to it.

The basic forms of crossover are single-point, double-point, multi-point and uniform crossover. Single-point crossover creates two offspring from two parents. The parents are randomly selected from population, the crossover site, $c_x$, is selected at random, and two offspring are made by both concatenating the bits that precede $c_x$ in the first parent with those follow $c_x$ in the second parent and performing the obverse operation.

For multi-point crossover, multiple crossover points are chosen at random with no duplicates and sorted in ascending order. Then, the variables between successive crossover points are exchanged between the two parents to produce two new offspring. The section between the first variable and the first crossover point is kept between individuals. The following example illustrates this process.

Consider the following two individuals with 11 binary variables each:

| | | | | | | | | | | | |
|---|---|---|---|---|---|---|---|---|---|---|---|
| individual 1 | 0 | 1 | 1 | 1 | 0 | 0 | 1 | 1 | 0 | 1 | 0 |
| individual 2 | 1 | 0 | 1 | 0 | 1 | 1 | 0 | 0 | 1 | 0 | 1 |
| cross points = 3 | | | 3 | | | 6 | | | | 10 | |

After crossover the new individuals are created:

| | | | | |
|---|---|---|---|---|
| offspring 1 | 0 1 1\| | 0 1 1\| | 1 1 0 1\| | 1 |
| offspring 2 | 1 0 1\| | 1 0 0\| | 0 0 1 0\| | 0 |

The disruptive nature of multi-point crossover appears to encourage the exploration of the search space, rather than favouring the convergence to highly fit individuals early in the search, thus making the search more robust.

In uniform crossover, a crossover mask which is a string of binary bits with the size of the chromosome, is generated randomly, the value of each bit in the mask determines for each corresponding bit in a child, which parent it will inherit that bit from. An example is given to illustrate the process.

| | |
|---|---|
| Parent 1: | 2 5 1 4 3 6 |
| Parent 2: | 4 6 2 1 5 3 |
| Mask: | 0 1 0 0 1 1 |
| Child 1: | 2 6 1 4 5 3 |
| Child 2: | 4 5 2 1 3 6 |

Mutation is used as a secondary operator which is randomly applied with small probability. It is a safety policy to be used sparingly with reproduction and crossover against premature convergence to a local optimum.

Two randomly selected distinct locations of the chromosome (individual) are exchanged. The other is "jump" where the integer in a randomly selected bit of the chromosome jumps to another feasible integer value.

The mutation probability represents the frequency of applying the mutation operator. The mutation rate for jump method is determined by the following condition $$m_u = \frac{1}{bitlength}$$

In addition to the previously mentioned techniques, further improvements can be achieved by including the following refinements:

Elitist selection strategy: the best individual is always kept in the next generation (see Eshelman. L. J: *The CHC adaptive search algorithms: How to have safe search when engaging in non-traditional genetic recombination. Foundation of Genetic Algorithms*. Gregory J. E. Rawlins (Eds), Morgan Kaufmann Publishers, pp. 265-283, 1991). Also, the stochastic universal sampling method is used to reduce sampling bias (see Baker. J. E: *Reducing bias and inefficiency in the selection algorithm. Proceedings of the Second International Conference on Genetic Algorithms*, pp 14-19, 1987).

A highly disruptive crossover method (Eshelman, op cit) is used to increase the GA capability to exploring a broader search space to find prospective zones which may lead to a new fitness peak.

Figure 2:
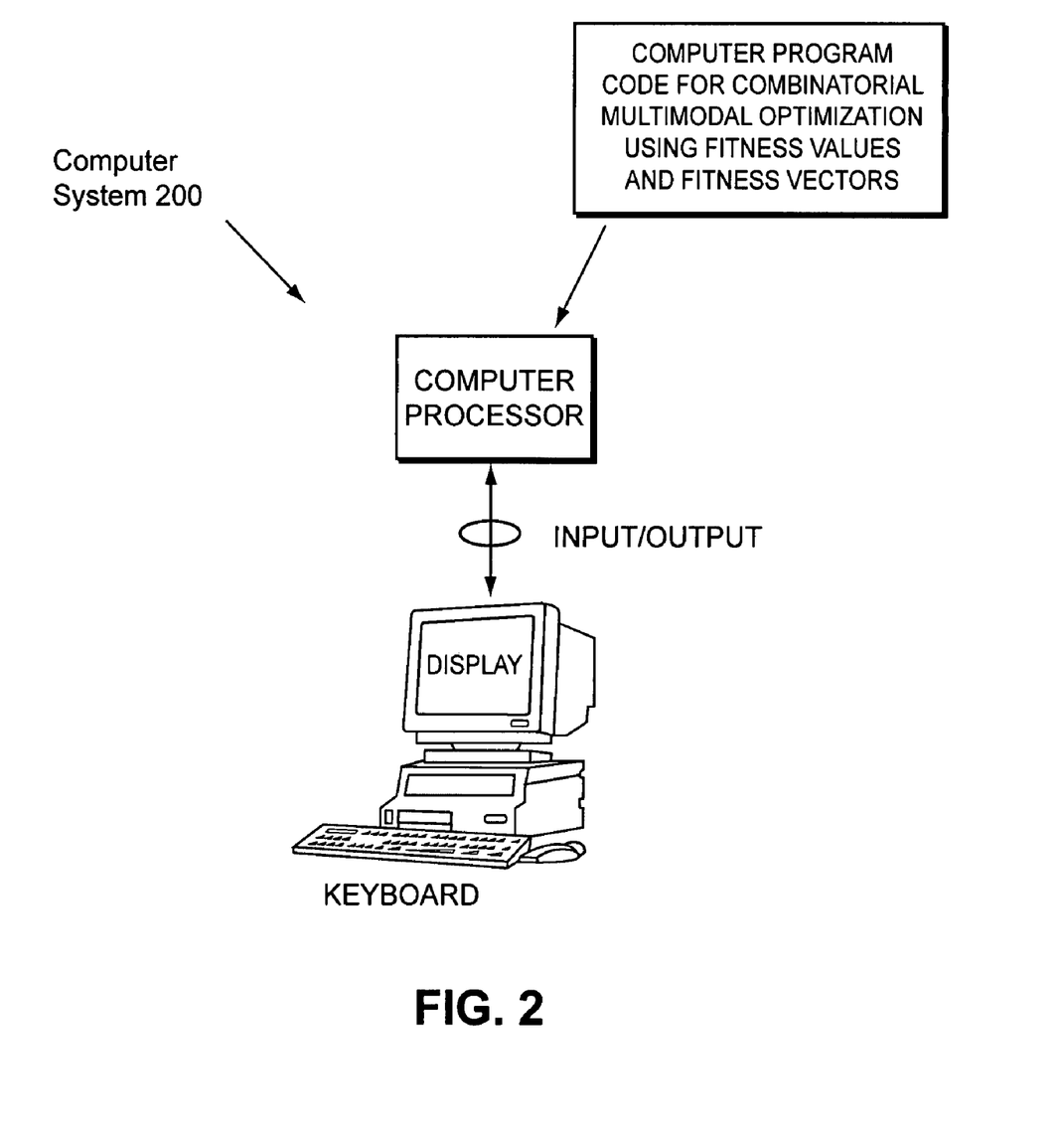

The method of the preferred embodiment may be implemented, without further inventive input, by a skilled computer programmer on the basis of the description given above. The algorithm may be conveniently implemented (in a conventional computer system 200 that has been suitably programmed as depicted in FIG. 2) along the lines of the following pseudocode:

Initialisation of Population
  Generation=0
  While termination condition not satisfied DO
  Construct phenotypic schemata vector M, fitness vector fv, through phenotypic cluster analysis
  Calculate the fitness value of all individuals
  Select suitable non-dominated individuals to form a sub-population whose size is a portion of overall population
  Select offspring to form new population using Roulette wheel selection method
  Apply highly uniform crossover and mutation to the new population
  Put all the sub-population into the new population
  Generation=Generation+1

Figure 3:
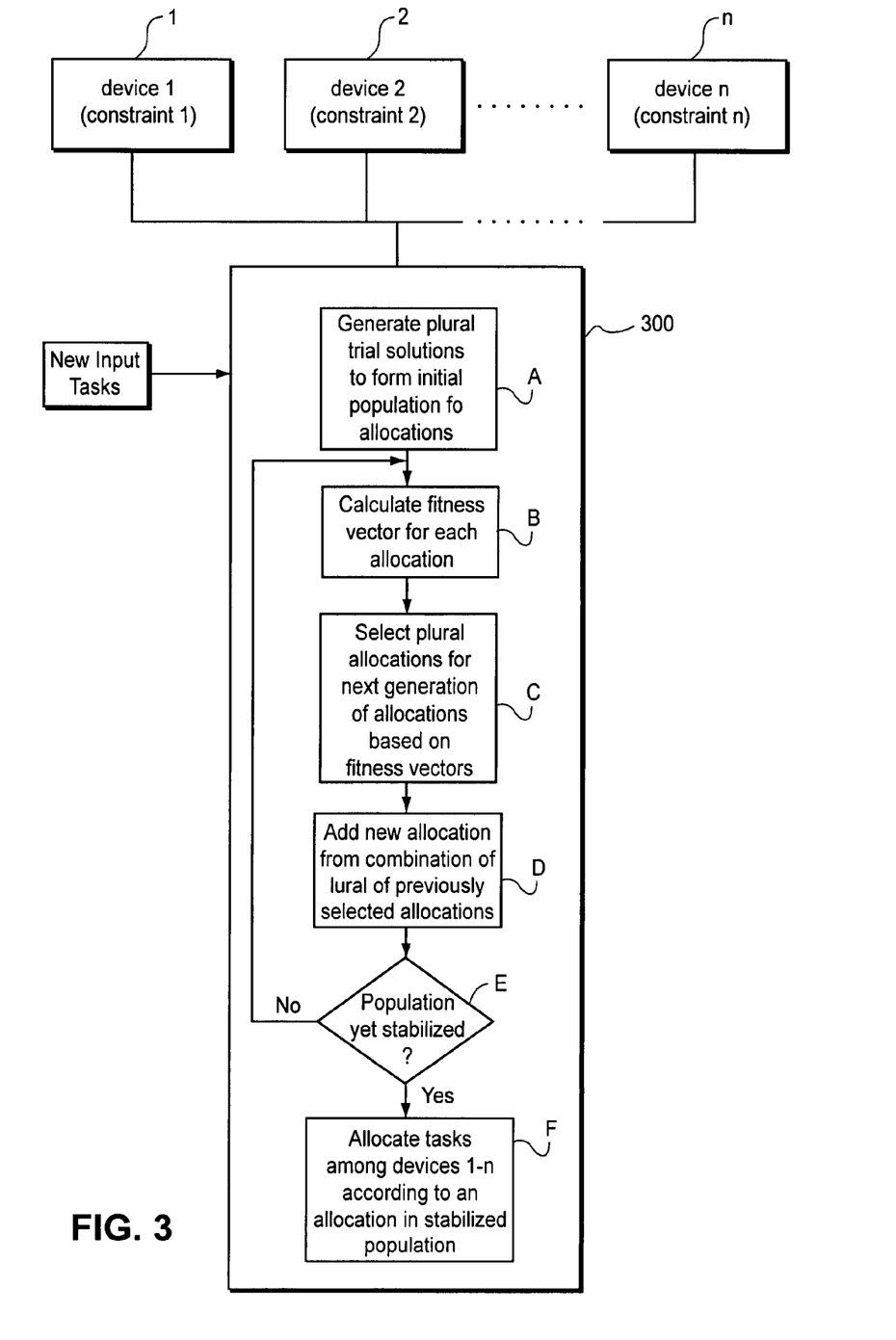

As depicted in FIG. 3, a system comprising a plurality of devices 1-*n* are connected together to form a network, wherein each device has an associated constraint on the amount of tasks that it can perform per unit of time. The system includes 300 (e.g., the computer system 200 of FIG. 2) for allocating a plurality of tasks among the devices. The allocation means includes (e.g., as defined by computer program code):

means A for generating a plurality of trial solution allocations to form an initial population of allocations;

means B for calculating for each allocation a fitness vector indicative of whether the constraint condition for each device has been satisfied;

means C for selecting a plurality of allocations for inclusion in the next generation of allocations in dependence upon their respective fitness vectors;

means D for creating the next generation of allocations by including the allocations selected by means C together with new allocations each of which is formed from a combination of two or more of the allocations selected by means C;

means E for repeating operation of means B to D until the population stabilizes; and means F for allocating the tasks among the devices according to one of the allocations included in the stabilized population.

What is claimed is:

1. An automated computerized method for optimizing allocation of a set W of n tasks to m available resources for accomplishing such tasks using combinatorial multimodal optimization for finding multiple optimal ways of dividing said set W of n tasks task values into m respective groups associated with said available resources, such that each of the groups satisfies a respective constraint condition, said method comprising:

using at least one computer to execute a computer program to automatically perform a series of machine operations comprising:

(a) receiving digital data signals representing plural tasks for assignment to said available resources and, based thereon, defining an initial population of trial solutions representing multiple optional ways of dividing the set W of n tasks between said m resources;

(b) calculating for each trial solution a fitness vector comprising m elements, each of which is indicative of whether the constraint condition of a corresponding respective one of the m groups has been satisfied by the trial solution;

(c) selecting a plurality of trial solutions for a next generation in dependence upon their respective fitness vectors;

(d) creating a new population of trial solutions including the selected earlier trial solutions;

(e) repeating steps (b) to (d) until the population of trial solutions stabilizes, the individual trial solutions of the stable population representing multiple optional ways of dividing the set W of n tasks to said m resources; and (f) outputting data representing at least one of the individual trial solutions of said stabilized population as an optimized allocation of tasks to resources.

2. A method as in claim 1 in which the fitness vector comprises m bits, each bit being indicative of whether the constraint condition of a corresponding one of the m groups has been satisfied.

3. A method as in claim 1 including calculating a fitness value for each individual trial solution.

4. A method as claimed in claim 2 including calculating a fitness value for each individual trial solution in which the fitness value comprises the sum of the bits in the fitness vector.

5. A method as in claim 1 including reserving a proportion of the new population for individual trial solutions selected at step (c).

6. A method as 5 in which a non-reserved proportion of the new population is generated using a Roulette wheel selection method.

7. A method as in claim 1 In which step (c) comprises selecting non-dominated individual trial solutions using the criteria of Pareto optimality.

8. A method as in claim 3 in which step (c) comprises selecting non-dominated individual trial solutions using the criteria of Pareto optimally including ranking non-dominated individual trial solutions by fitness value, and selecting from the ranked list.

9. A method as in claim 8 in which only non-dominated individual trial solutions with greatest fitness value may be selected at step (c).

10. A method as in claim 3 in which step (c) comprises selecting individual trial solutions in dependence upon both their respective fitness vectors and their respective fitness values.

11. A method as in claim 1 in which crossover and mutation are applied at step (d) to at least some individual trial solutions in the new population.

12. A method as in claim 1 in which step (c) comprises selecting no more than one individual trial solution for each unique fitness vector.

13. A method as in claim 1 in which new allocations are formed in step (d) by performing crossover operations in respect of groups of two or more of the allocations selected in step (c).

14. An automated computerized method of distributing a plurality of tasks between a plurality of devices connected together to form a network, wherein each device has an associated constraint on the amount of tasks that it can perform per unit of time, said method comprising:
using at least one computer to execute a computer program to automatically perform a series of machine operations comprising:
(a) generating a plurality of trial solutions representing multiple allocations of tasks to devices to form an initial population of allocations;
(b) calculating for each trial solution a fitness vector comprising a plurality of elements each of which is indicative of whether the associated constraint of with a corresponding respective one of the plurality of devices and is indicative of whether the constraint associated with that corresponding respective device has been satisfied by the trial solution independently of the extent to which the constraints associated with the other devices have been satisfied by the trial solution;
(c) selecting a plurality of allocations of tasks to devices for inclusion in a next generation of allocations in dependence upon their respective fitness vectors;
(d) creating the next generation of allocations of tasks to devices by including the allocations selected in step (c) together with new allocations, each of which is formed from a combination of two or more of the allocations selected in step (c);
(e) repeating steps (b) to (d) until the population stabilizes; and
(f) outputting data representing an allocation of the tasks among the devices according to one of the allocations included in the stabilized population.

15. A method as in claim 14 wherein the devices are processors within a multi-processor computer system.

16. A method as in claim 14 wherein the devices are computers within a computer network.

17. A method as in claim 14 wherein the devices are routers and the tasks are estimated volumes of traffic to be routed through the routers within a data network, and wherein the allocations are used to form a routing strategy.

18. A method as in claim 14 in which step (c) comprises selecting non-dominated allocations using the criteria of Pareto optimality of the associated fitness vectors.

19. A method as in claim 14 in which mutation operations are applied to one or more of the new allocations formed in step (d) according to a predetermined probability of each new allocation being mutated.

20. A computer readable medium containing a computer program which, when executed effects a method for optimizing allocation of a set W of n tasks to m available resources for accomplishing such tasks using combinatorial multimodal optimization for finding multiple optimal ways of dividing said set W of n tasks into m resource groups, such that each of the groups satisfies a respective constraint condition, said method comprising:
using at least one computer to execute a computer program to automatically perform a series of machine operations comprising:
(a) defining an initial population of trial solutions representing multiple optional ways of dividing the set W of n tasks between said m resources;
(b) calculating for each trial solution a fitness vector comprising m elements, each of which is indicative of whether the constraint condition of a corresponding respective one of the m groups has been satisfied by the trial solution;
(c) selecting a plurality of trial solutions for a next generation in dependence upon their respective fitness vectors;
(d) creating a new population of trial solutions including the selected earlier trial solutions;
(e) repeating steps (b) to (d) until the population of trial solutions stabilizes, the individual trial solution of the stable population representing multiple optional ways of dividing the set W of n tasks between said m resources; and
(f) outputting data representing at least one of said stabilized population as an optimized allocation of tasks to resources.

21. A system comprising a plurality of devices connected together to form a network, wherein each device has an associated constraint on the amount of tasks that it can perform per unit of time, the system including an allocation subsystem for allocating a plurality of tasks among the devices, the allocation subsystem comprising:
(a) means for generating a plurality of trial solution allocations representing multiple allocations of tasks among the devices to form an initial population of allocations;
(b) means for calculating for each trial solution allocation a fitness vector comprising a plurality of elements each of which is indicative of whether the associated constraint of with a corresponding respective one of the plurality of devices and is indicative of whether the constraint associated with that corresponding respective device has been satisfied by the trial solution independently of the extent to which the constraints associated with the other devices have been satisfied by the trial solution;
(c) means for selecting a plurality of allocations for inclusion in a next generation of allocations in dependence upon their respective fitness vectors;
(d) means for creating the next generation of allocations by including the allocations selected in step (c) together with new allocations each of which is formed from a combination of two or more of the allocations selected in step (c);
(e) means for repeating steps (b) to (d) until the population stabilizes; and
(f) means for outputting an allocation of the tasks among the devices according to one of the allocations included in the stabilized population.

22. A method of operating a multi-processor computer system to execute a computer program including a set of multiple separate tasks which must all be completed in order for the program execution to be complete, said method comprising:

distributing multiple of said set of program tasks between multiple computer program processor devices to efficiently accomplish all such distributed tasks wherein each computer program processor device has an associated constraint on the amount of tasks that it can perform per unit of time, said distribution of tasks to said processor devices being accomplished by:

(a) receiving digital data signals representing a set of plural tasks for assignment to available processor devices and, based thereon, defining an initial population of trial solutions representing multiple optional ways of dividing the set of tasks between said processor devices;

(b) calculating for each trial solution a fitness vector comprising a plurality of elements each of which is indicative of whether the constraint of associated with a corresponding respective one of the multiple computer program processor devices and is indicative of whether the constraint associated with that corresponding respective computer program processor device has been satisfied by the trial solution independently of the extent to which the constraint associated with the other computer program processor devices have been satisfied by the trial solution;

(c) selecting a plurality of trial solutions for a next generation in dependence upon their respective fitness vectors;

(d) creating a new population of trial solutions including the selected earlier trial solutions;

(e) repeating steps (b) to (d) until the population of trial solutions stabilizes, the individual trial solutions of the stable population representing multiple optional ways of dividing the input set of tasks; and (f) outputting task assignments to said processor devices in conformance with at least one of said stabilized population as an optimized allocation of tasks to resources.

23. A multi-processor computer system for executing a computer program including a set of multiple separate tasks which must all be completed in order for the program execution to be complete, said system comprising:

a plurality of computer program processors; and means networked with said multiple computer program processors for distributing multiple of said set of program tasks between said multiple computer program processor devices to efficiently accomplish all such distributed tasks wherein each computer program processor device has an associated constraint on the amount of tasks that it can perform per unit of time, said distribution of tasks to said processor devices being accomplished by:

(a) receiving digital data signals representing a set of plural tasks for assignment to available processors and, based thereon, defining an initial population trial solutions representing multiple optional ways of dividing the set of tasks between said processors;

(b) calculating for each trial solution a fitness vector comprising a plurality of elements each of which is indicative of whether the constraint of associated with a corresponding respective one of the multiple computer program processor devices and is indicative of whether the constraint associated with that corresponding computer program processor device has been satisfied by the trial solution independently of the extent to which the constraints associated with the other computer program processor devices have been satisfied by the trial solution;

(c) selecting a plurality of trial solutions for a next generation in dependence upon their respective fitness vectors;

(d) creating a new population of trial solutions including the selected earlier trial solutions;

(e) repeating steps (b) to (d) until the population of trial solutions stabilizes, the individual trial solutions of the stable population representing multiple optional ways of dividing the input set of tasks, and (f) outputting task assignments to said processors in conformance with at least one of said stabilized population as an optimized allocation of tasks to resources.

* * * * *